United States Patent

Tumbers

[11] Patent Number: 6,159,262
[45] Date of Patent: Dec. 12, 2000

[54] FERTILIZERS

[75] Inventor: Neil Tumbers, Currumbin, Australia

[73] Assignee: Palmrow Pty. Ltd., New South Wales, Australia

[21] Appl. No.: 08/894,037

[22] PCT Filed: Feb. 14, 1996

[86] PCT No.: PCT/AU96/00076

§ 371 Date: Aug. 8, 1997

§ 102(e) Date: Aug. 8, 1997

[87] PCT Pub. No.: WO96/25373

PCT Pub. Date: Aug. 22, 1996

[30] Foreign Application Priority Data

Feb. 14, 1995 [AU] Australia .................................. PN1127

[51] Int. Cl.[7] ................................ C05F 11/08; C05F 3/00
[52] U.S. Cl. ................................ 71/7; 71/8; 71/9; 71/11; 71/21; 71/64.1
[58] Field of Search ................................ 71/24, 13, 23, 71/7, 9, 903, 64.1, 11, 21, 8

[56] References Cited

U.S. PATENT DOCUMENTS

| | | | |
|---|---|---|---|
| 4,528,028 | 7/1985 | Flint et al. | 71/113 |
| 4,997,592 | 3/1991 | Woogerd | 71/65 |
| 5,403,587 | 4/1995 | McCue et al. | 424/195.1 |
| 5,482,529 | 1/1996 | Ahlnas et al. | 71/64.08 |
| 5,538,529 | 7/1996 | Northrop | 71/24 |
| 5,658,458 | 8/1997 | Keyser et al. | 210/195.1 |
| 5,707,551 | 1/1998 | Pallas et al. | 71/64.08 |
| 5,865,869 | 2/1999 | Hansen | 71/64.1 |

FOREIGN PATENT DOCUMENTS

| | | | |
|---|---|---|---|
| 3319989 | 10/1989 | Australia | C02F 3/28 |
| 1 235 917 | 3/1988 | Canada . | |
| 2431998 | 3/1980 | France | C02F 3/28 |
| 95/34521 | 6/1995 | WIPO . | |

*Primary Examiner*—Wayne Langel
*Attorney, Agent, or Firm*—Renner, Otto, Boisselle & Sklar, LLP

[57] ABSTRACT

A fertilizer composition comprises an organic waste, an anti-bacterial agent, a wetting agent, an odor control agent and water.

20 Claims, No Drawings

FERTILIZERS

FIELD OF THE INVENTION

The present invention relates to improvements in fertilisers, and specifically to an improved fertiliser composition containing a waste such as manure, a process for its production and methods of using it to improve the growth of plant and/or overcome or at least reduce the deleterious effect of insects upon plants.

BACKGROUND ART

It has long been known that the growth of plants can be improved with fertilisation, that is by providing the plant with a ready source of the nutrients that it requires for growth. This is especially necessary in areas of poor quality soil which is unable to satisfactorily sustain the growth of a large number of plants. Fertilisers commonly include compounds containing nitrogen and phosphorous as well as other minerals required for plant growth, in forms which can be either sprayed on the soil surrounding the plant or in a solid form which can be directly added to the soil. It is also common for known fertilisers to contain a pH stabilising component, that is either an acid or base which can alter the soil pH, to acidify basic soil or to make acidic soil more alkaline.

A particularly common type of fertiliser which has been used in the past is animal manure which contains a large number of nutrients excreted by various animals, which when added to soil will improve its capacity to sustain plant growth. While there are significant advantages with the use of manure, in that it is cheap, easy to obtain and a useful means of utilising a waste product, its use as a fertiliser is also associated with a number of problems.

Firstly, animal manure (and human faeces for that matter) contains a large number of bacteria which contribute to the unpleasant odour associated with manure, and can also be dangerous when manure fertilisers are utilised in relation to food crops. Also, the bacteria associated with manure fertilisers contribute to decomposition of the manure and other organic matter associated with it, such that insects are often attracted. The presence of large numbers of insects can also be damaging upon the plant which the fertiliser is intended to aid the growth of, as various insects will utilise the growing plant as a food source.

It is therefore an object of the present invention to provide an improved fertiliser composition which can overcome the problems associated with manure fertilisers known to date and is relatively inexpensive to produce.

It is further an object of the present invention to develop a fertiliser which can enrich soils used for plant growth and thereby enhance the growth of the plants, at the same time utilising waste manure which is high in nutrient value, but overcoming the problems of odour, decomposition and bacterial presence, which currently limit the usefulness of manure based fertilisers.

OBJECT OF THE INVENTION

It is also an object of the present invention to provide a method of manufacture of such a fertiliser and additionally processes by which the fertilizers can be utilised to improve plant growth and possibly also to reduce the damage caused by insects to plants treated with the fertiliser.

In one form, the invention resides in a fertiliser composition comprising:

(a) an aqueous organic waste solution, (b) an anti-bacterial agent, (c) a wetting agent, (d) an odour control agent In a preferred embodiment the waste is a manure such as poultry manure, the wetting agent is a mixture of sulphonic acid and caustic soda, the anti-bacterial agent, and odour control agents are either eucalyptus oil, tee tree oil, or a mixture of both. An additional nitrogen containing component which is also preferably present is urea, and a foaming agent which is also preferably present is coconut diethanolamide.

In another preferred embodiment of the invention an insecticide is also added to the fertiliser and preferably this insecticide is either eucalyptus oil, tea tree oil, or a mixture of both. A colouring agent may also be added to the composition.

According to another embodiment of the present invention there is also provided a process of preparing a fertiliser comprising the steps of:

(a) mixing organic waste with water and stirring to dissolve the manure and optionally adding a flocculent, and then allowing the mixture to stand for at least two hours;

(b) removing any solid material from the mixture of (a) and then taking at least a portion of the resulting solution and adding a wetting agent, an anti-bacterial agent, a preservative and an odour control agent;

(c) Optionally also adding a nitrogen containing compound and/or a foaming agent;

(d) adjusting the pH of the solution to between 7.5 and 10.5, by the addition of acid or base as required;

(e) optionally adding a colouring agent.

It is preferred that the organic waste is a manure and mixture of manures.

Suitably, the mixture of (a) is allowed to stand for at least 48 hours and preferably 72 hours to facilitate some biodegradation of the waste.

This can be promoted by ensuring that a temperature is maintained which promotes the degradation. Suitable temperatures can be between 20° C.–30° C. and particularly between 22° C.–28° C.

The degradation process can be enhanced further by the addition of bacterial cultures. A suitable culture is of the pseudomonas family.

Bacterial cultures can be added to:

(a) Assist in the de-composition of the solids.

(b) To increase the nutrient value for plants and soil.

(c) Suppress plant pest such as fungi, algae and plant pathogenic bacteria.

(d) Eliminate harmful pathogens.

(e) To incorporate in the product the ability to "fix nitrogen" from the air.

According to a still further embodiment of the present invention there is provided a process for improving the growth of plants which comprises treating soil adjacent to the plant with an amount of the fertiliser composition according to the present invention. Optionally, this process may also prevent or at least reduce the deleterious effect of insects upon the plants, by including an insecticide within the fertiliser composition.

The primary component of the fertiliser composition according to the present invention is organic waste such as manure. The particular manure utilised may be that of any animal, or indeed even human faeces or sewage sludge. In fact the manure utilised in the present invention can even be mixtures of various different types of manure. As can clearly be recognised, manure is a waste product which is often difficult to dispose of due to its inherent odour and bacterial content. It is therefore most advantageous that manure can be utilised in the present invention as it not only results in the formation of a valuable product, but it also allows safe disposal of a waste product.

The present invention can be carried out using manure from animals including for example, cattle, sheep, horses, poultry or other birds or even human faecal wastes or sewage sludge. It may be desirous, depending upon the nature of the fertiliser which is to be prepared to specifically include one type of manure, such as for example poultry manure which may be especially high in phosphorous content. The inclusion of such manure in the fertiliser composition would be particularly suited for treating low phosphorous soils or perhaps to feed plants which have a high demand for phosphorous. In other adaptations however it may be desirable to utilise a blend of various manures to obtain the optimum nutrient content for the particular soil type and plants which are to be sustained utilising the fertiliser composition. Other organic waste products can include fish emulsions and molasses, particularly the "C" molasses fraction from sugar mills. Molasses assists in retention of the fertiliser in the soil and especially sandy soil and also reduces plant damage by nematodes as nematodes are preferentially attracted to molasses.

It is also to be borne in mind that the manure used need not be in the form of fresh manure, but may be processed to some extent. For example, it is possible that the manure may have been dried or dehydrated, or in fact even diluted to form a manure or sewage type sludge.

As has been explained above, in order to overcome the problems associated with the use of manure fertilisers known to-date, it is necessary to include a number of other agents in the fertiliser in conjunction with the manure base. One of these agents is an anti-bacterial agent, which will significantly reduce the bacterial content of the manure sample, thereby reducing its potential toxicity to various plants and animals, and also contributing at least to some extent to the reduction in the unpleasant odour associated with manure samples. It is to be recognised that operation for the present invention is possible with any known, broad spectrum type anti-bacterial agent, such as for example known commercial anti-bacterial agents, alcohols such as for example isopropyl, alcohol and methylated spirits and quaternary solutions of for example, alkyl, benzyl, dimethyl, ammonium and chloride. However, it is preferred, that the anti-bacterial agent used should be a natural product. In this way the anti-bacterial agent will be somewhat milder and less toxic than particular synthetic anti-bacterial agents and as a result will be more appealing to the users of the fertiliser composition due to health and safety concerns. Examples of natural product anti-bacterial agents are essential oils obtained from plants, especially from Australian native plants. Suitable essential oils can be obtained from the following plant species:

| Botanical Name | Common Name |
| --- | --- |
| Eucalyptus polybractea | Eucalyptus blue malee (Australian) |
| E. rad v. australiana/dives 'O' | Eucalyptus radiata (Australian) |
| Eucalyptus citriodora | Eucalyptus, lemon scented |

-continued

| Botanical Name | Common Name |
| --- | --- |
| Halichrysum italicum | Everlast/immortelle |
| Foeniculum vulgare v. dulce | Fennel sweet |
| Boswellia carterli | Frankincense |
| Ferula galbaniflua | Galbanum |
| Pelargonium roseum | Geranium |
| Zinglber officinale | Ginger |
| Citrus paradisi | Grapefruit |
| Gualacum officinale | Gualaowood |
| Jasminum officinale | Jasmin absolute |
| Hlerochloe alpina | Hay absolute |
| Juniperus communis | Juniper berry |
| Lavandula hybrida | Lavandin |
| Lavandula officinalis/angustifolia | Lavender Mont Blanc |
| Lavandula officinalis/angustifolia | Lavender Tasmanian |
| Lavandula spica | Lavender spike |
| Citrus Ilmonum | Lemon |
| Cymbopogon citratus | Lemongrass |
| Citrus medioa | Lime |
| Litsea cubeba | Litsea |
| Citrus nobilis/dellciosa | Mandarin |
| Citrus aurantium dulce | Orange sweet |
| Cymbopagan martini | Palmarosa |
| Petroselinum crispum | Parsley herb |
| Pogostermon patchouli | Patchouli |
| Piper negrum | Pepper black |
| Mientha piperita officinalis | Peppermint (Australian) |
| Mientha piperita officinalis | Peppermint (Italian) |
| Citrus aurantium (leaves) | Patltgrain |
| Pinus sylvesiris | Pine |
| Rosa damascena | Rose absolute |
| Rosmarinue officinalis | Rosemary |
| Aniba rosaedora | Rosewood |
| Salvia officinalis | Sage (Dalmation) |
| Santalum album | Sandalwood |
| Mentha sploata | Spearmint (Australian) |
| Tagetes patula | Tagetes |
| Citrus reticulata | Tangarine |
| Mei-l-terpinen-4-ol type | Tea tree (Australian) |
| Terebinth | From resin of various pines |
| Thymus vulgaris | Thyme (Red) |
| Polyanthes tuberosa | Tuberose Absolute |
| Andropogon muricatua | Veliver |
| Viola Odorata | Violet leaf absolute |

An odour control agent may be incorporated, in order to overcome the unpleasant odour associated with the manure. Again, it is possible to use any known odour control agent, including synthetic and natural products. Examples of suitable odour control agents are orthodichloro benzene and various enzymes. Once again however, it is preferred that the odour control agents should be a natural product, for the same reason as referred to above in relation to the anti-bacterial agent. Therefore, extracts of pine or lemon, which are associated with a pleasant odour are particularly suitable. It is especially interesting to note however, that the Australian essential oils referred to above in relation to the anti-bacterial agent, also exhibit a significant odour control activity, and for this reason essential oils such as eucalyptus oil, tea tree oil, banksia oil, and the other essential oils referred to above are especially preferred as they exhibit a dual activity.

The usefulness of these essential oils is in fact amplified still further as by acting as an anti-bacterial agent, they effectively also slow the rate of decomposition of the manure itself and other organic matter which it comes in contact with, thereby acting as a kind of preservative.

It is important to note that various anti-bacterial and/or odour control agents may be mixed, in order to obtain the most effective anti-bacterial odour control characteristics of the fertiliser compositions. In the most preferred form of the present invention a mixture of eucalyptus and tea tree oils is utilised.

Another feature of the present invention is the use of a wetting agent. By the terms "wetting agent" what is meant is the use of an agent which will act as a surfactant to reduce the surface tension of the liquid mixture of components in the fertiliser composition. By reducing the surface tension, the various components of the mixture, some of which are immiscible, are able to mix more homogeneously, and because of low surface tension the fertiliser composition is more easily able to flow into the soil upon which it may be applied. In this way the uptake of the fertiliser composition by the plant roots can be maximized. Examples of suitable wetting agents are known wetting agents manufactured from a detergent base, but in the present invention the most preferred wetting agent is comprised of a mixture of caustic soda and sulphonic acid. While any sulphonic acid can be utilised, the wetting agent exhibits the most favourable characteristics when the sulphonic acid is alkylbenzene sulphonic acid. Other wetting agents can include sodium lauryl sulfate.

As will be recognised from the comments in relation to the wetting agent, the fertiliser composition according to the present invention is preferably provided as a liquid mixture, with the manure base product being dissolved in water and then having any remaining solid material removed from the solution. This process can be undertaken by adding a flocculent to the water manure mixture, before allowing the mixture to stand for at least two hours. While it is not essential to add a flocculent, this will speed the process of separating the solid material from the manure solution. While other flocculants can be utilised, it is noted that the tea tree oil, which has been referred to above as also having anti-bacterial and odour control activity, also acts as a flocculant. It is therefore desirous that a small amount of tea tree oil should be added to the manure and water mixture prior to allowing this mixture to stand for at least two hours. To allow complete separation of the solid material from the manure solution, it is preferred that the manure and water mixture should be allowed to stand for around 24 hours. The manure solution can then easily be separated from the solid material by draining the solution off from the precipitated solids.

The reason for removing the solid material is in order that the resulting fertiliser composition can be effectively sprayed. Naturally, if there is too much solid material in the fertiliser composition, the spraying apparatus could easily be blocked and spraying would be ineffective. It is possible, however, in another embodiment of the invention for the resulting solution to be dried so that a solid fertiliser composition is then formed. Its is also possible that other material such as seaweed, kelp or vegetation wastes can be included to aid the formation of a solid fertiliser composition. This solid composition can then be used in the form of a powder, granules or even pelletised using standard methods, to form a pelleted fertiliser composition. This solid composition would then largely dissolve when the soil upon which it has been applied is either rained upon or watered. In this way, and due to the presence of the wetting agent, the fertiliser composition will dissolve and flow into the soil to be absorbed by the plant roots.

Under certain circumstances it may be necessary to include within the fertiliser composition of the present invention an additional nitrogen source. Examples of some other nitrogen containing compounds which can be incorporated into the fertiliser composition to increase the nitrogen content are seaweed, kelp and vegetation wastes such as the pulp of tea tree obtained as a by-product of extracting the essential oil. In a preferred form of the invention the nitrogen containing compound is urea, which apart from being easy to obtain and relatively inexpensive, is also able to enhance the effectiveness of the wetting agent.

An additional optional ingredient in the fertiliser composition of the present invention is a foaming agent. By incorporating a foaming agent the fertiliser composition can easily be seen by a person spraying it onto an area of soil being fertilised. This will aid the person spraying the fertiliser to distinguish the areas which have been treated from those which have not. A particularly preferred foaming agent is coconut diethanolamide. This foaming agent is preferred as it not only contributes to the nutrient levels, specifically to the nitrogen content, of the fertiliser composition but it also enhances the wetting agent effectiveness while also, as mentioned above, providing a foaming effect. Although coconut diethanolamide is the preferred foaming agent, other suitable agents are known foaming agent such as lauric diethanolamide.

Another preferable feature of the present invention is in incorporation of an insecticide into the composition. Manure based fertilisers often attract many insects, which can be damaging to the plant life which is being sustained by the fertiliser composition, as many of the insects will utilise the plant life as a food source, thereby severely damaging the plants and hindering their growth capacity. It is therefore desirous to reduce the amount of insects attracted by the manure component of the fertiliser and also to reduce the amount of existing insects which may be harmful to plant growth. This can be done by incorporating an insecticide into the composition. Although it is possible to include any known insecticide into the composition, it is once again desirable that the insecticide should be a natural product. Examples of suitable insecticides which can be incorporated into the composition are piperonyl butoxide and natural and synthetic pyrethrins. However, the most preferred insecticide agents are eucalyptus oil and tea tree oil, which as mentioned above, also have the other characteristics of being anti-bacterial and odour control agents, and are particularly effective in combination with the wetting agent.

It is to be recognised that the fertiliser composition according to the present invention can be utilised in a broad range of ways. It can be utilised in order to improve the growth of commercial crops, for example in market gardens or in large scale agriculture as well as also having applications for the household gardener to improve the growth of for example vegetable gardens or potted plants. It has also been found that the fertiliser composition of the present invention is especially effective in improving the growth of turf and therefore has broad applications for large scale gardening and sports surfaces such as golf fairways and greens and lawn bowling greens or lawn tennis courts. In general, the fertiliser composition according to the present invention can be utilised in place or any known fertiliser to improve the growth of a broad range of plants. As mentioned previously, it is also possible to vary the fertiliser composition according to specific needs, such as for example the soil nutrient content of pH, as well as particular plant growth requirements.

Ideally, the fertiliser composition of the present invention will be applied by spraying to areas of soil directly adjacent to the plants which are to be fertilised. It is also possible however that the fertiliser composition can be dried and possibly added to other solid material such as seaweed, kelp or vegetation waste to form a powder, granules or pellets which can also be applied to the soil on its surface, to be substantially solubilised when the soil is wet, or alternatively mixed into the soil. When the fertiliser composition contains an insecticide agent the process of fertilising the plants will not only result in improved plant growth, but also reduction in insects on or around the plants which may be damaging to the plant health.

BEST MODE

The fertiliser composition can be prepared by the following process:
1. Mix an amount of manure, which may be a mixture of various types of manure, or manure which has been processed to some extent to form a sludge, with water and stir to solubilise the manure.
2. Optionally add a flocculent such as for example tea tree oil, to aid separation of solid material from the manure solution.
3. Allow the manure solution and solid mixture to stand for at least two hours, and preferably for around 24 hours, and then separate the manure solution from the remaining solids, or maintain the mixture at 22° C.–28° C. while adding a bacterial culture from the pseudomonas family and allowing the mixture to stand for at least 72 hours with occasional aeration, before separation.
4. Add a wetting agent to the manure solution, and optionally if desired, also add a foaming agent which is preferably coconut diethanolamide.
5. If desired, add an additional nitrogen containing component, which is preferably urea.
6. Add the anti-bacterial and odour control agents, which most preferably are a mixture of eucalyptus oil and tea tree oil.
7. Test the pH of the mixture and if necessary adjust the pH such that it is within the range of 7.5 to 10.5, by the addition of acid or base as required. Although any common acids or basis can be utilised, the most preferable acid is citric acid and the most preferred base is caustic soda.
8. If required add a colouring agent to the composition, such that the resultant composition will more appropriately blend in colour with is natural surroundings. An example of suitable dying or colouring agent is green food grade dye.
9. Further dilution with water may be necessary in order to obtain a liquid which is of a suitable viscosity for spraying, and of a suitable concentration for the particular application to which the fertiliser is to be applied.

It is to be recognised that the present invention has been described by way of example only and that modifications and amendments may be made thereto, in accordance with methods which are known to those skilled in the art. For instance, the ingredients of steps 4–6 can be pre-mixed before addition to the manure solution.

The present invention will now be further described by reference to the following examples.

EXAMPLE 1

This example relates to a preferred formulation and process for manufacture of a fertiliser composition in accordance with the present invention. A batch size of 200 liters volume can be manufactured according to this process.
1. Take equal parts by volume of poultry manure and water and stir until dissolved 2. Add 0.125% Tea Tree Oil.
3. Allow to stand for 24 hours and then drain off solids.
4. Take 150 liters of this solution and whilst stirring and 3 kg of Caustic Soda Pearls.
5. Add 7 kg of Coconut Diethanolamide and stir until homogeneous.
6. Add 24 kg of Alkylbenzene Sulphonic Acid.
7. Add 10 kg of Prilled Urea.
8. Add 2 kg of Eucalyptus Oil and then add 250 ml of Tea Tree Oil.
9. Check pH is about 9.0 and if necessary adjust pH by adding Citric Acid if too alkaline or Caustic Soda if too acidic.
10. Add green food grade dye.
11. Add 50 liters of water.

EXAMPLE 2

Example 2 relates to the results obtained after use of the fertiliser composition of Example 1.

The fertiliser was placed on a golf course fairway and golf tee area at a dilution rate of 1:20 with water. The product was applied to a golf green and watered in. The results were killing of black beetle and turf grub which could be seen within 5 minutes of application. Greening and rapid growth of the grass was evident after 3 days. The effect of the wetting agent was still distinct 3 weeks after application.

Another golf green that had bad insect and fungus problems was treated with 2 liters of fertiliser per 100 sq m of green and a further area with 1 liter of fertiliser per 100 sq m of green. Both areas had noticeable kill within minutes of black beetle and turf grub. Both areas also had noticeable greening within days of application. The area that had 2 liters per 100 sq m application also had noticeable reduction in fungus on the green within 5 days.

Another section of turf was treated with the product applied at 1:10 dilution with the same results as above. 14 days later the same area was treated with the product diluted at 1:30. Another 14 days later the same area was treated with the product diluted at 1:50. Constant mowing was carried out during this time, the increase of growth root was such that the area adjacent which had not been treated, was noticeably lower than the treated area i.e. the root growth expanded the height of the soil by some 2 centimeters, giving a lush covering of turf. This area adjacent received the same amount of watering and mowing and the growth rate and root coverage remained in the same with no change.

The product was also applied to indoor plants, i.e. palm trees, shrubs, etc that had discoloured due to lack of care. Within 2 days, noticeable greening in the plants had occurred.

The product was also applied to a garden flower "*Allemanda Carthartica Schollii*" (Golden Trumpet). Of three plants, only two were treated with the fertiliser. The two that were treated showed noticeable greening and also began to bloom within 4 days. The plant that was not treated remained yellowed and did not bloom.

The product had also been compared with the results of Dynamic Lifter™, blood and bone, and sulphate of ammonia. In all comparison tests, the product resulted in faster greening and growth. In all comparisons, no other product has been able to provide all three results that the present product showed, i.e. wetting agent, fertiliser and insecticide.

EXAMPLE 3

750 kg of chicken manure was placed in a mixing tank and 250 liters of water was added. The temperature of the mixture was kept between 22° C.–28° C. 17.5 liters of a bacteria culture from the family pseudomonas (at a cell count of 109 cells per liter) was added to the mixture and the mixture was left for at least 72 hours with 5 minutes of aeration every 4 hours. The mixture was filtered through a gauze strainer to separate the formed sludge. The filtrate is known as "nutrient waters".

In an open-headed polylined vessel fitted with an air stirrer is added while stirring, 50 kg of sodium lauryl sulfate, 100 kg urea, 200 liters molasses, 10 liters eucalyptus oil and 2.5 liters tea tree oil. The mixture is stirred until homogenous to form a concentrate.

382.5 kg of the concentrate are mixed with 617.5 liters of the nutrient waters and 10 kg of a nitrogen fixing bacteria is added. The mixture is stirred for 15 minutes. The pH of the mixture is adjusted to about 7 by addition of citric acid or sodium hydroxide as the case may be. This final mixture can be used as the fertiliser and contains the following:

5% sodium lauryl sulfate

10% urea

20% molasses

1% eucalyptus oil 0.25% tea tree oil

2% bacterial culture 67.7% nutrient waters

The solution of Example 3 when diluted to 20-1 and applied at about 6 ml/m² was found to effectively kill or reduce Mole Crickets, Lawn Armyworms, and African Black Beetle.

It should be appreciated that various changes and modifications may be made to the embodiments described without departing from the spirit and scope of the invention.

What is claimed is:

1. A fertilizer composition comprising a water soluble organic waste, which has been at least partially biodegraded under aerobic conditions, an anti-bacterial agent which can reduce the level of pathogenic bacteria in the waste, a wetting agent, an odor control agent and water, wherein the anti-bacterial and odor control agents may be the same or different.

2. The composition of claim 1, wherein the organic waste is a manure.

3. The composition of claim 2, wherein the anti-bacterial agent and the odor control agent are the same and are selected from the group consisting of eucalyptus oil and tea tree oil.

4. The composition of claim 3, which includes a nitrogen containing component.

5. The composition of claim 4, wherein the nitrogen containing component is urea.

6. The composition of claim 5, wherein the wetting agent is sodium lauryl sulfate.

7. The composition of claim 4, including a non-pathogenic bacterial culture.

8. The composition of claim 7, wherein the bacterial culture is selected from the group consisting of the pseudomonas family and nitrogen fixing bacteria.

9. The fertilizer composition of claim 8 comprising about 5% sodium lauryl sulfate, about 10% urea, about 20% molasses, about 1% eucalyptus oil, about 0.25% tea tree oil, about 2% bacterial culture and about 62% aqueous organic waste.

10. The fertilizer composition of claim 1 which includes an insecticidal agent.

11. The fertilizer composition of claim 1 which includes a nematode attractant.

12. A process of preparing a fertilizer of claim 1, comprising the steps of:

(a) mixing an organic waste with water to form a mixture, (b) adding a bacterial culture to the mixture and allowing the mixture and culture to react under aerobic conditions, (c) separating the liquid portion from the formed sludge, (d) adding to the liquid portion a wetting agent and at least one essential oil, (e) adjusting the pH of the liquid portion to a value suitable for application to the soil.

13. The process of claim 12, wherein the organic waste is a manure.

14. The process of claim 13, wherein the bacterial culture is selected from the pseudomonas family.

15. The process of claim 14, wherein the mixture and culture is reacted at between 20° C.–30° C. for at least 70 hours.

16. The process of claim 15, wherein the at least one essential oil is eucalyptus oil and tea tree oil.

17. The process of claim 16, wherein urea is added to the liquid portion.

18. The process of claim 17, wherein molasses is added to the liquid portion.

19. The process of claim 16, wherein the wetting agent is sodium lauryl sulfate.

20. A product produced by the process of claim 19.

* * * * *